(12) United States Patent
Chi-Hsueh et al.

(10) Patent No.: US 10,710,443 B2
(45) Date of Patent: Jul. 14, 2020

(54) MULTI-RING DISC MOTOR

(71) Applicants: Richard Chi-Hsueh, San Diego, CA (US); Chung-Yeh Hsu, New Taipei (TW)

(72) Inventors: Richard Chi-Hsueh, San Diego, CA (US); Chung-Yeh Hsu, New Taipei (TW)

( * ) Notice: Subject to any disclaimer, the term of this patent is extended or adjusted under 35 U.S.C. 154(b) by 299 days.

(21) Appl. No.: 15/696,673

(22) Filed: Sep. 6, 2017

(65) Prior Publication Data

US 2018/0109169 A1    Apr. 19, 2018

Related U.S. Application Data

(60) Provisional application No. 62/409,397, filed on Oct. 18, 2016, provisional application No. 62/412,246, filed on Oct. 24, 2016.

(51) Int. Cl.
*B60K 6/26* (2007.10)
*F01N 3/10* (2006.01)
(Continued)

(52) U.S. Cl.
CPC .................. *B60K 6/26* (2013.01); *B60K 6/28* (2013.01); *B60K 6/36* (2013.01); *B60K 6/40* (2013.01); *B60K 6/46* (2013.01); *B60K 17/16* (2013.01); *B60K 20/02* (2013.01); *B60L 50/16* (2019.02); *F01N 3/08* (2013.01); *F01N 3/101* (2013.01); *H02K 1/165* (2013.01); *H02K 1/18* (2013.01); *H02K 1/27* (2013.01); *H02K 1/30* (2013.01); *H02K 5/161* (2013.01); *H02K 5/225* (2013.01); *H02K 7/006* (2013.01); *H02K 7/04* (2013.01);

(Continued)

(58) Field of Classification Search
CPC .......... H02K 7/006; H02K 7/04; H02K 5/161; H02K 5/225; H02K 1/165; H02K 1/18; H02K 1/27; H02K 1/30; H02K 11/215; B60K 6/26; B60K 6/28; B60K 6/36; B60K 6/40; B60K 6/46
USPC ...... 310/68 B, 89, 91, 112, 113, 114, 154.06, 310/154.25, 156.12
See application file for complete search history.

(56) References Cited

U.S. PATENT DOCUMENTS

| | | | |
|---|---|---|---|
| 9,738,150 B2 | 8/2017 | Chi-Hsueh | |
| 2010/0244606 A1* | 9/2010 | Kim | H02K 15/03 310/156.13 |

(Continued)

FOREIGN PATENT DOCUMENTS

CN    104875593 B    5/2017

*Primary Examiner* — Nguyen Tran
(74) *Attorney, Agent, or Firm* — Rosenberg, Klein & Lee

(57) ABSTRACT

A multi-ring disc motor is revealed. The multi-ring disc motor includes a plurality of stator rings and a plurality of permanent magnets. The stator rings are disposed in a stator base and the permanent magnets are mounted on a plurality of circular ribs of a rotor base. The permanent magnets on the respective circular rib of the rotor base are corresponding to a coil on the stator ring in a respective circular groove of the stator base by the stator base and the rotor base connected to each other. Thereby high torque and high horsepower are generated by the stator rings on the stator base and the permanent magnets on the circular ribs of the rotor base. The power consumption is reduced effectively. Thus the battery life of vehicles such as cars is extended and this eliminates the needs to stop for charging.

10 Claims, 9 Drawing Sheets

(51) Int. Cl.
- *B60L 50/16* (2019.01)
- *H02K 11/215* (2016.01)
- *B60K 6/28* (2007.10)
- *B60K 6/36* (2007.10)
- *B60K 6/40* (2007.10)
- *B60K 6/46* (2007.10)
- *B60K 17/16* (2006.01)
- *B60K 20/02* (2006.01)
- *F01N 3/08* (2006.01)
- *H02K 1/16* (2006.01)
- *H02K 1/27* (2006.01)
- *H02K 1/30* (2006.01)
- *H02K 5/22* (2006.01)
- *H02K 7/00* (2006.01)
- *H02K 16/00* (2006.01)
- *H02K 1/18* (2006.01)
- *H02K 5/16* (2006.01)
- *H02K 7/04* (2006.01)
- *B60L 50/61* (2019.01)

(52) U.S. Cl.
CPC .......... *H02K 11/215* (2016.01); *H02K 16/00* (2013.01); *B60L 50/61* (2019.02); *B60L 2220/50* (2013.01); *F01N 2590/11* (2013.01); *Y02A 50/2324* (2018.01); *Y02T 10/22* (2013.01); *Y10S 903/906* (2013.01)

(56) References Cited

U.S. PATENT DOCUMENTS

2012/0032545 A1\* 2/2012 Hsu .................. H02K 7/12
310/103
2015/0130315 A1\* 5/2015 Wallace .............. H02K 7/083
310/91

\* cited by examiner

MULTI-RING DISC MOTOR

REFERENCE TO RELATED APPLICATIONS

This Application claims benefit to Provisional Patent Application Ser. No. 62/409,397 filed 18 Oct. 2016, and Provisional Patent Application Ser. No. 62/412,246, filed 24 Oct. 2016, both of which are currently pending.

BACKGROUND OF THE INVENTION

Field of the Invention

The present invention relates to a disc motor, especially to a multi-ring disc motor with simple structure that not only generates high torque and high horsepower, but also saves energy effectively.

Description of Related Art

Generally, a motor vehicle propelled by an engine is gasoline-powered. Owing to the problems of global warming and air pollution caused by exhaust emissions, other vehicles such as hybrid vehicles and electric vehicles have been developed and manufactured.

A cylindrical motor used by the hybrid vehicle and the electric vehicle is originally designed to be fixed in the factory while in use. The cylindrical motor is connected to a power source and used for turning machines without storage batteries. Thus it is not suitable for vehicles. Refer to FIG. 9, a cylindrical motor 8 now used in the hybrid vehicle or electric vehicle is revealed. The cylindrical motor 8 mainly includes a central shaft 81, a cylindrical rotor with induction coils 82 connected to the central shaft 81, and two pieces of permanent magnets 83 enclosed around the cylindrical rotor with induction coils 82. The horsepower generated is quite limited because that the cylindrical motor 8 includes only two permanent magnets 83 and the torsion radius thereof is smaller. In order to increase the horsepower output, more electric energy is required. Thus the battery life of the electric vehicle is poor and users often need to stop and charge the vehicle.

Thus there is room for improvement and there is a need to provide a novel motor that overcomes the shortcomings of the motor available now such as low horsepower, high energy consumption. Etc.

SUMMARY OF THE INVENTION

Therefore it is a primary object of the present invention to provide a multi-ring disc motor that features on simple structure, high torque and high horsepower generation, and energy-saving operation.

In order to achieve the above object, a multi-ring disc motor of the present invention is designed based on U.S. Pat. No. 9,738,150 B2 and Chinese Patent Pub. No. CN 104875593 B, entitled "energy efficient vehicle and disc-type dynamic motor thereof." The multi-ring disc motor includes a stator base and a rotor base. A cavity is formed in the stator base and an axial hole is arranged at a center of a bottom of the cavity. A plurality of concentric circular ribs having different sizes is disposed around the axial hole and a plurality of circular grooves is formed between the two adjacent circular ribs respectively. Each of the circular grooves is mounted with a stator ring and the stator ring is arranged with a plurality of coils. As to the rotor base, a sleeve is formed at a center of a base body thereof and an axial hole is penetrating the center of the sleeve. A positioning part is formed on a wall of the axial hole. A plurality of concentric circular ribs of different sizes and having a common center is arranged around the axial hole and a plurality of circular grooves is formed between the two adjacent circular ribs respectively. A plurality of permanent magnets is disposed on an outer wall of the circular rib. The rotor base and the stator base are aligned and connected to make the respective circular rib of the stator base and the respective stator ring mount in the respective circular groove of the rotor base correspondingly while the respective circular rib of the rotor base and the permanent magnets mounted on the respective circular rib are received in the respective circular groove of the stator base correspondingly. Thereby the permanent magnets on the respective circular rib of the rotor base are corresponding to the coils on the stator ring in the respective circular groove of the stator base. A cover is covered over an opening of the cavity of the stator base to be fastened and connected with the stator base. An axial hole is set on a center of the cover. A shaft is passed through the axial hole of the cover, the axial hole of the rotor base, and the axial hole of the stator base while a positioning part of the shaft is connected to and positioned by the positioning part on the wall of the axial hole of the rotor base.

The present multi-ring disc motor further includes at least one Hall element that is disposed on the stator ring and connected to the coils of the stator ring.

A plurality of coil mounting holes is axially formed on an end surface of the stator ring and one coil is wound between the two adjacent coil mounting holes.

A mounting slot formed on an inner wall of the stator ring is corresponding to and communicating with the coil mounting hole. The Hall element is mounted and positioned in the mounting slot of the coil mounting hole.

A plurality of mounting parts is formed concavely on an outer wall of the respective circular rib and used for receiving the permanent magnets respectively.

A plurality of locking slots is formed on an outer wall of the stator ring while a plurality of locking member corresponding to the locking slots is formed on the circular rib and on a wall of the cavity for being locked with and positioning by the locking slots of the stator ring respectively.

A plurality of balancing pieces is disposed on a circumference of the base body of the rotor base while a reinforcement piece is formed on a bottom side of each balancing piece, located on the circumference of the base body of the rotor base and integrated with the balancing piece.

A recess is arranged at a center of a bottom of the cavity and the axial hole is formed on the bottom of the recess. A bearing is mounted in the recess and is stopped on an opening of the recess by a stopper so as to be positioned in the recess. The shaft is passed through the axial hole of the stator base and the bearing of the stator base.

A recess is formed at a center of an inner surface of the cover and the axial hole is set on the bottom of the recess. A bearing is mounted in the recess and is stopped on an opening of the recess by a stopper. Thus the bearing is positioned in the recess. The shaft is passed through the axial hole and the bearing of the cover.

Thereby the multi-ring disc motor of the present invention not only outputs high torsion and high horsepower but also saves power by the simple design of a plurality stator rings in a stator base and a plurality of permanent magnets mounted on a plurality of circular ribs of a rotor base. Thus the battery life of the vehicle is extended and this eliminates the needs to stop for charging. Moreover, the motor is not easily damaged while in use owing to the simple structure. Thus the production cost and the maintenance cost are further minimized.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content and functions of the present invention clearly, please refer to the following detailed description, related figures and reference numbers of the components therein.

Figure 1:
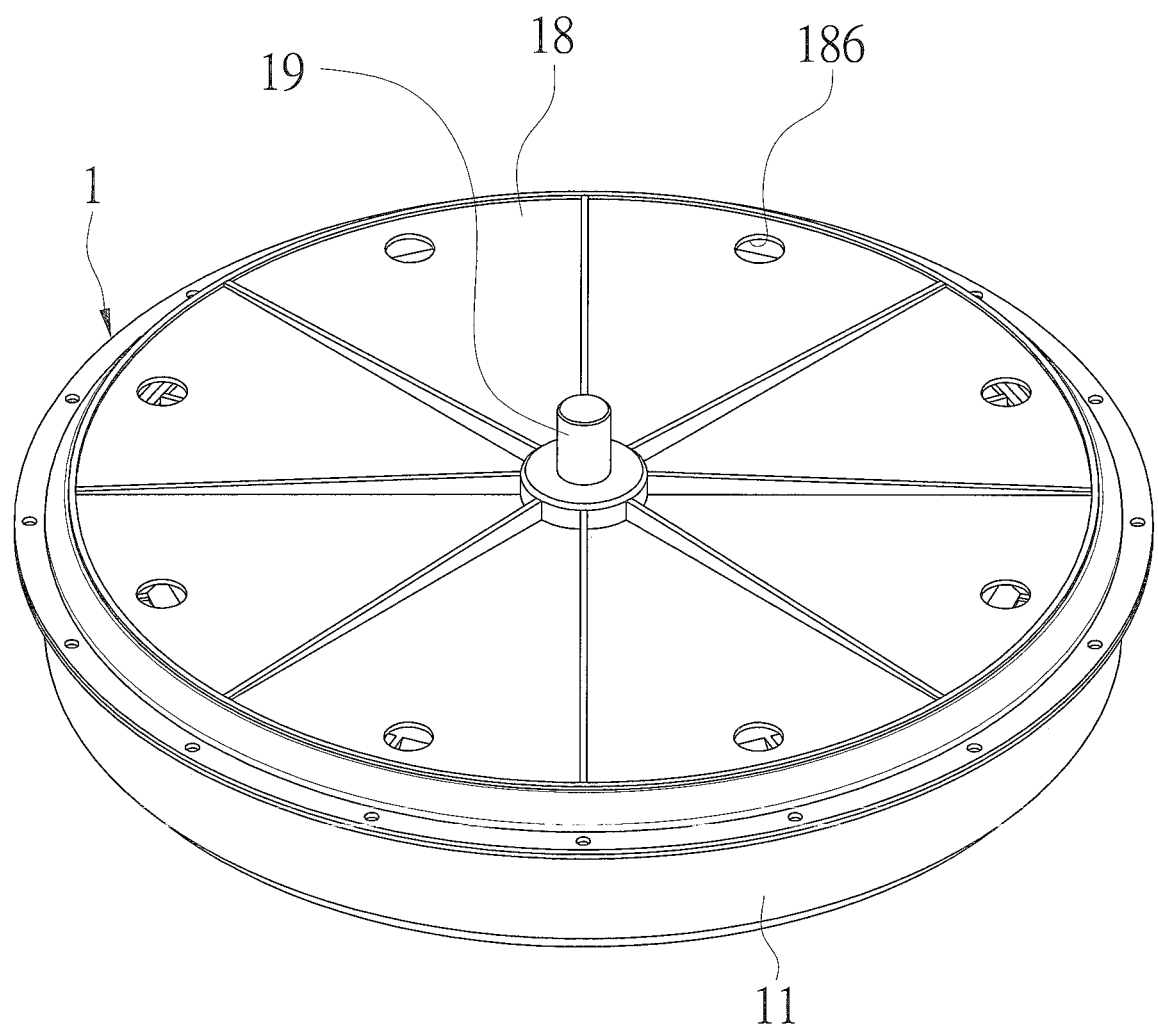
FIG. 1 is a perspective view of an embodiment according to the present invention.
Figure 2:
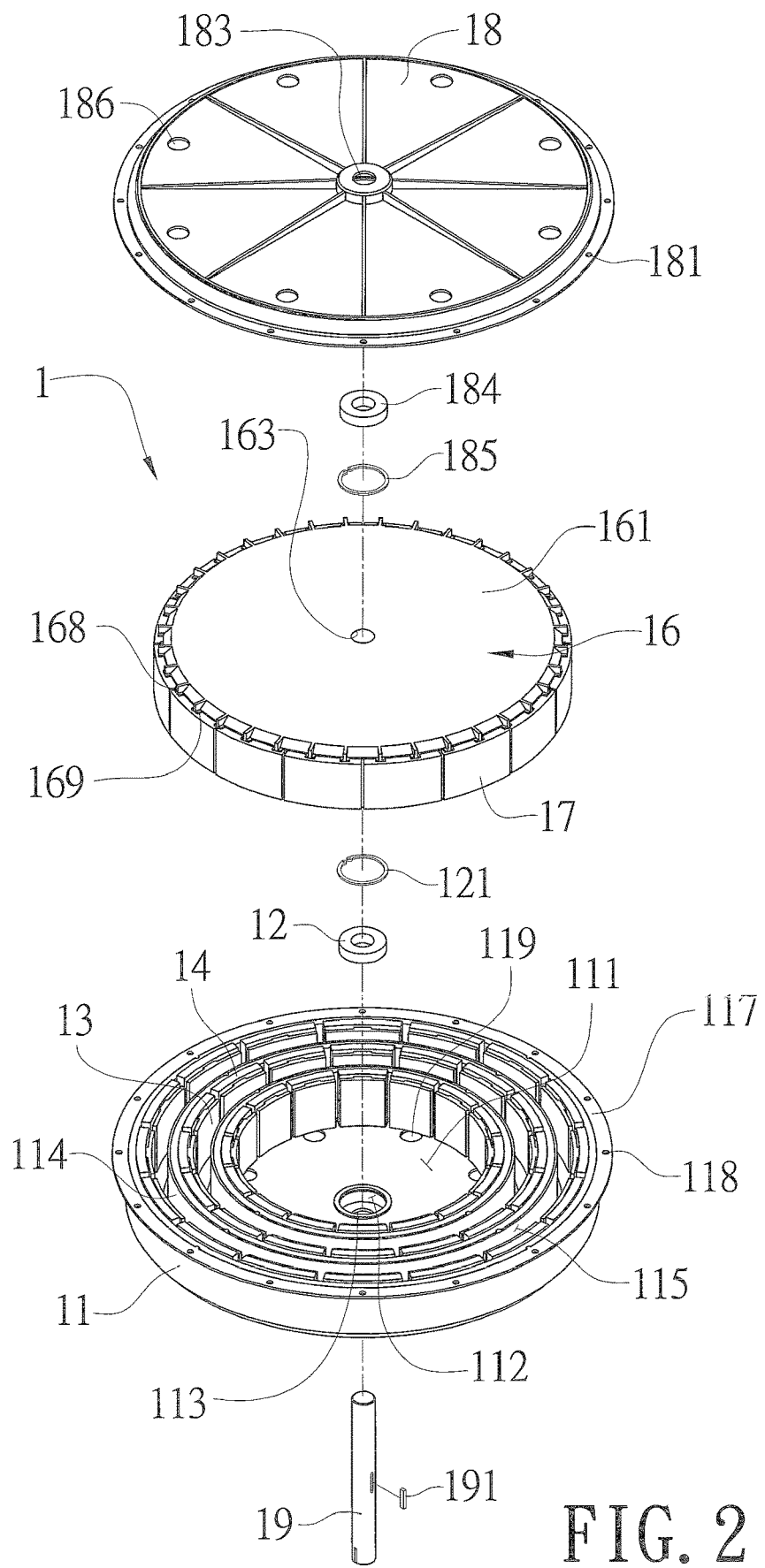
FIG. 2 is an explosive view of an embodiment according to the present invention.
Figure 3:
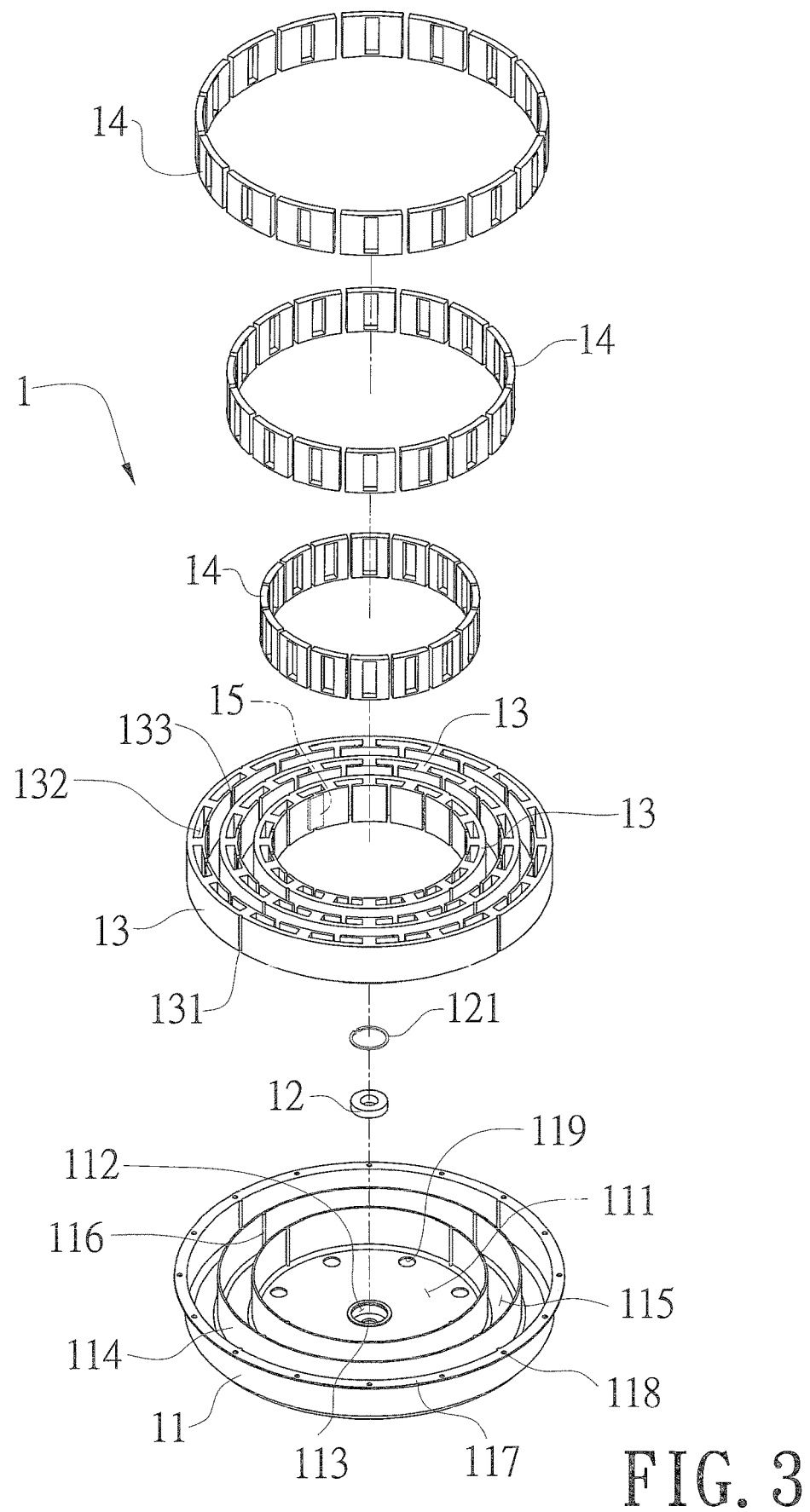
FIG. 3 is an explosive view of a stator base, stator rings and coils of an embodiment according to the present invention.
Figure 4:
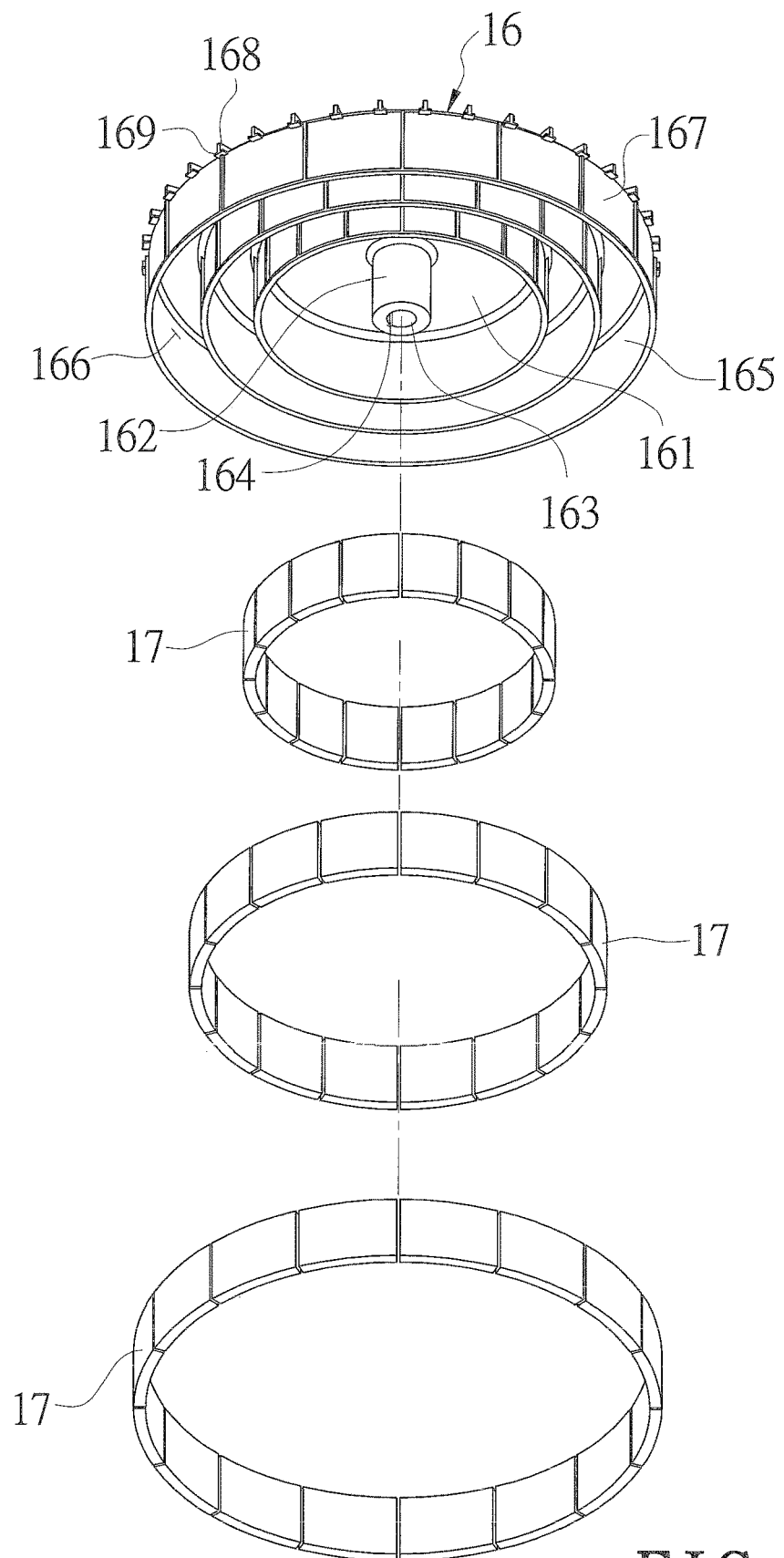
FIG. 4 is an explosive view of a rotor base, and permanent magnets of an embodiment according to the present invention.

Refer from FIG. 1 to FIG. 5, a multi-ring disc motor 1 according to the present invention mainly includes a stator base 11, a bearing 12, a plurality of stator rings 13, a plurality of coils 14, a Hall element 15, a rotor base 16, a plurality of permanent magnets 17, a cover 18, and a shaft 19. Refer to FIG. 2 and FIG. 3, a cavity 111 is formed in the stator base 11 while a recess 112 is arranged at a center of a bottom of the cavity 111 and an axial hole 113 is penetrating the bottom of the recess 112. The bearing 12 is mounted in the recess 112 and is stopped on an opening of the recess 112 by a stopper 121 such as a C-shaped fastener. Thus the bearing 12 is positioned in the recess 112. Moreover, a plurality of concentric circular ribs 114 of different sizes and having a common center is disposed around the axial hole 113 on the bottom of the cavity 111 of the stator base 11. A plurality of circular grooves 115 is formed between the two adjacent circular ribs 114 respectively. The stator ring 13 made from silicon steel is mounted in each circular groove 115 and including a plurality of locking slots 131 formed on an outer wall thereof A plurality of locking member 116 corresponding to the locking slots 131 is formed on the circular rib 114 and on a wall of the cavity 111 for being locked with and positioning by the locking slots 131 of the stator ring 13. A plurality of coil mounting holes 132 is axially formed on an end surface of the stator ring 13 while a mounting slot 133 formed on an inner wall of the stator ring 13 is corresponding to and communicating with the coil mounting hole 132. The coil 14 is wound between the two adjacent coil mounting holes 132 and the adjacent coils 14 are connected in series. At least one of the coils 14 is connected to the Hall element 15 that is mounted and positioned in the mounting slot 133 of the coil mounting hole 132. A connecting flange 117 with a plurality of fastening holes 118 is set around an opening of the cavity 111 of the stator base 11. Refer to FIG. 4, the rotor base 16 includes a base body 161, a sleeve 162 formed at a center of the base body 161, an axial hole 163 penetrating the center of the sleeve 162, a key-slot-shaped positioning part 164, a plurality of concentric circular ribs 165 of different sizes and having a common center, a plurality of circular grooves 166, a plurality of mounting parts 167, a plurality of balancing pieces 168 and a plurality of reinforcement pieces 169. The key-slot-shaped positioning part 164 is formed on a wall of the axial hole 163. The concentric circular ribs 165 are arranged around the axial hole 163 of the base body 161 of the rotor base 16. The circular grooves 166 are formed between the two adjacent circular ribs 165 respectively. The mounting parts 167 are formed concavely on an outer wall of the circular ribs 165 and used for receiving the permanent magnets 17 respectively. Refer to FIG. 4 and FIG. 6, the balancing pieces 168 are disposed on a circumference of the base body 161 of the rotor base 16 while the reinforcement piece 169 is formed on a bottom side of each balancing piece 168, integrated with the balancing piece 168 and located on the circumference of the base body 161 of the rotor base 16. The rotor base 16 and the stator base 11 are aligned and connected to make the respective circular rib 114 of the stator base 11 and the respective stator ring 13 mount in the respective circular groove 166 of the rotor base 16 correspondingly while the respective circular rib 165 of the rotor base 16 and the permanent magnet 17 mounted on the respective circular rib 165 are mounted in the respective circular groove 115 of the stator base 11 correspondingly. Thereby the permanent magnet 17 on the respective circular rib 165 of the rotor base 16 is corresponding to the coils 14 on the stator ring 13 in the respective circular groove 115 of the stator base 11.

Figure 5:
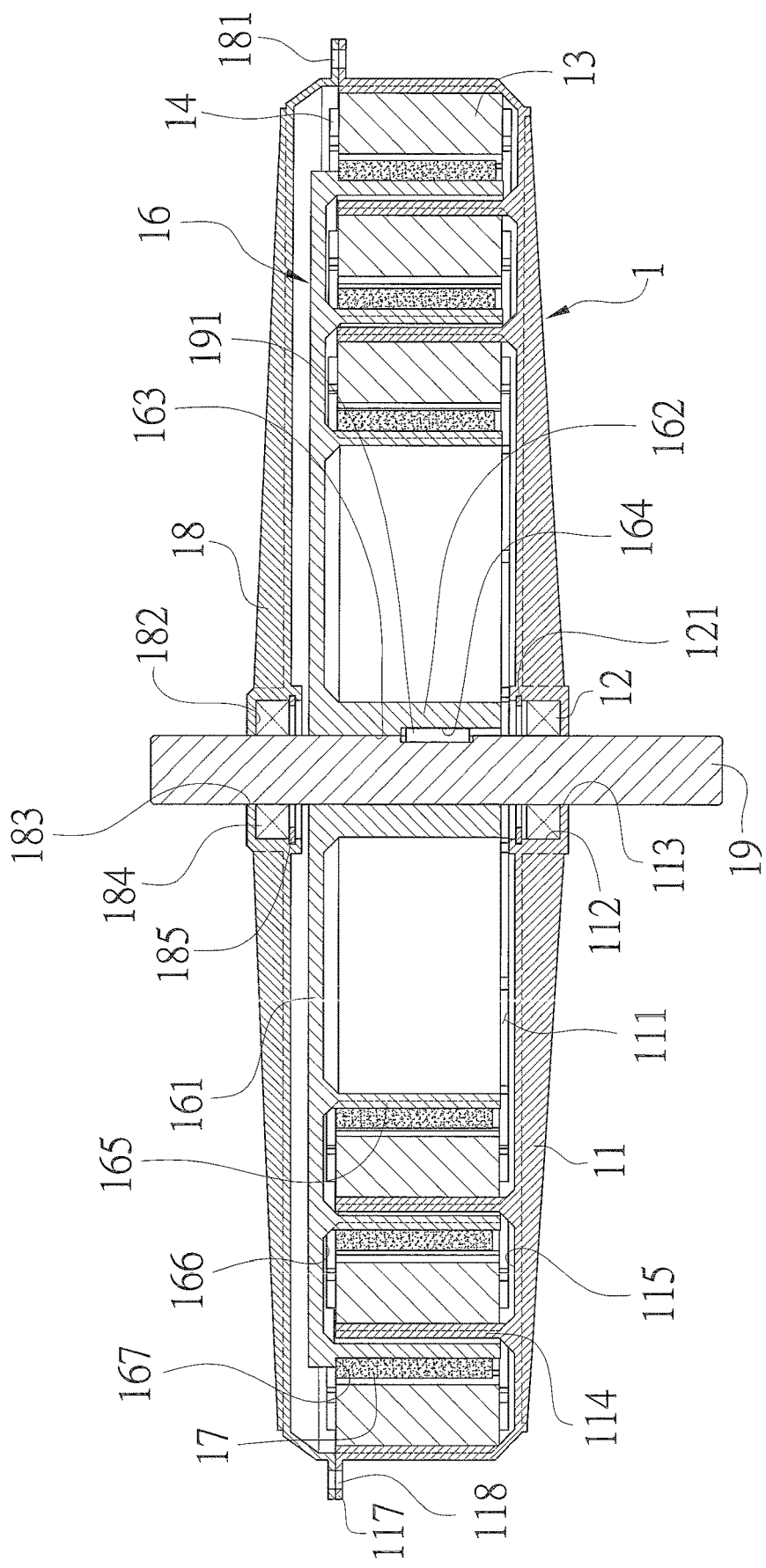
FIG. 5 is a sectional view of an embodiment according to the present invention.
Figure 6:
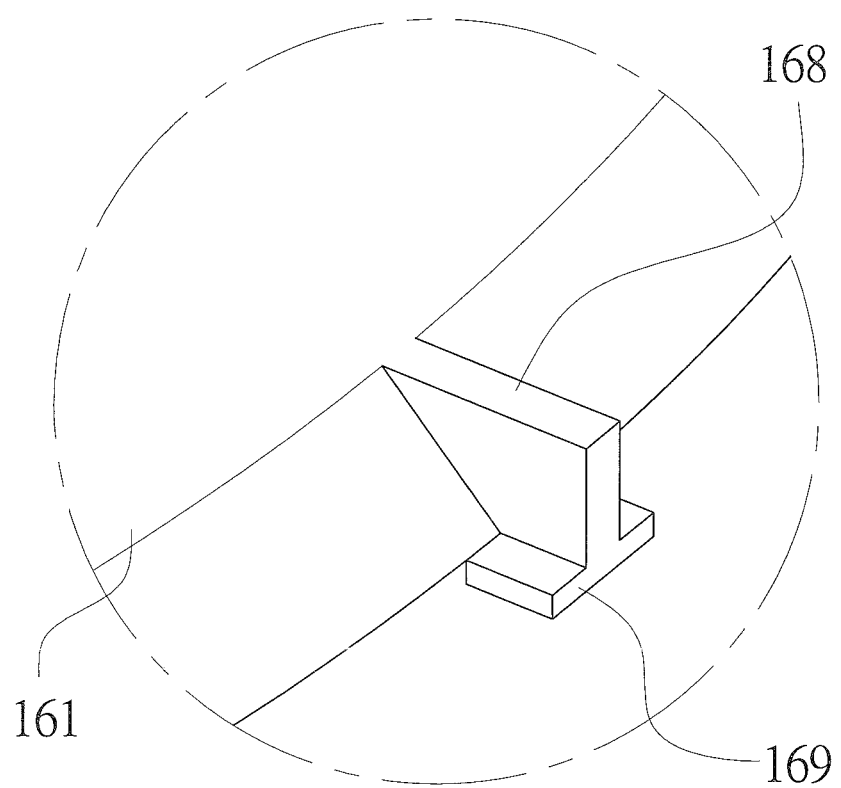
FIG. 6 is a partial enlarged view of a rotor base of an embodiment according to the present invention.

Refer to FIG. 2 and FIG. 5, the cover 18 is covered over the opening of the cavity 111 of the stator base 11 while a plurality of fastening holes 181 is arranged around the cover 18 and corresponding to the fastening holes 118 of the connecting flange 117. A fastener is passed through the fastening hole 181 of the cover 18 and the fastening hole 118 of the stator base 11 for fastening and connecting the cover 18 with the stator base 11. A recess 182 is formed at a center of an inner surface of the cover 18 and an axial hole 183 is penetrating the bottom of the recess 182. A bearing 184 is mounted in the recess 182 and stopped on an opening of the recess 182 by a stopper 185 such as a C-shaped fastener. Thus the bearing 184 is positioned in the recess 182. The axial hole 183 of the cover 18 is aligned with the axial hole 163 of the rotor base 16 and the axial hole 113 of the stator base 11. As shown in FIG. 5, the shaft 19 is passed through the axial hole 183 of the cover 18, the bearing 184 in the recess 182 of the cover 18, the axial hole 163 of the rotor base 16, the bearing 12 in the recess 112 of the stator base 11, and the axial hole 113 of the stator base 11. The shaft 19 is also disposed with a key-block-shaped positioning part 191 for being locked with and positioned by the key-slot-shaped positioning part 164 on the wall of the axial hole 163 of the rotor base 16. Two ends of the shaft 19 are extended from the axial hole 183 of the cover 18 and the axial hole 113 of the stator base 11 respectively. A plurality of through holes 186, 119 is formed on the cover 18 and the bottom of the cavity 111 of the stator base 11 respectively.

Figure 7:
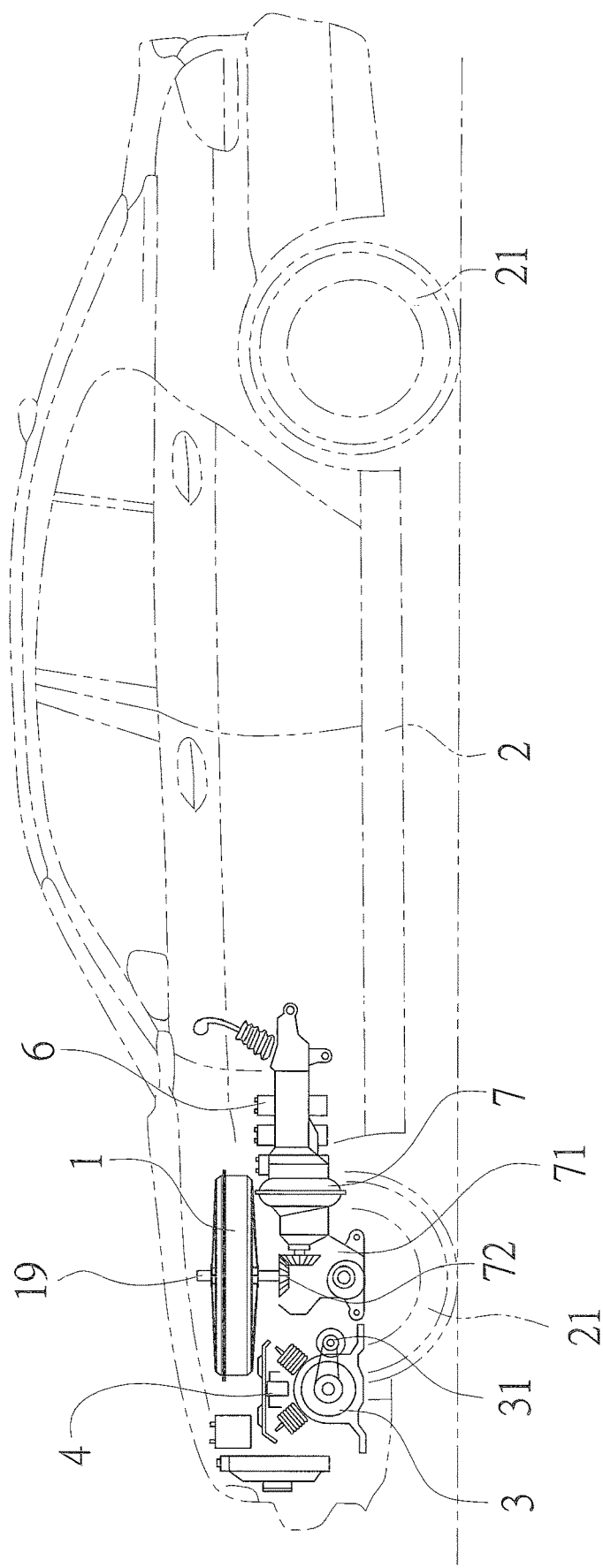
FIG. 7 is a front view of an embodiment in use according to the present invention.
Figure 8:
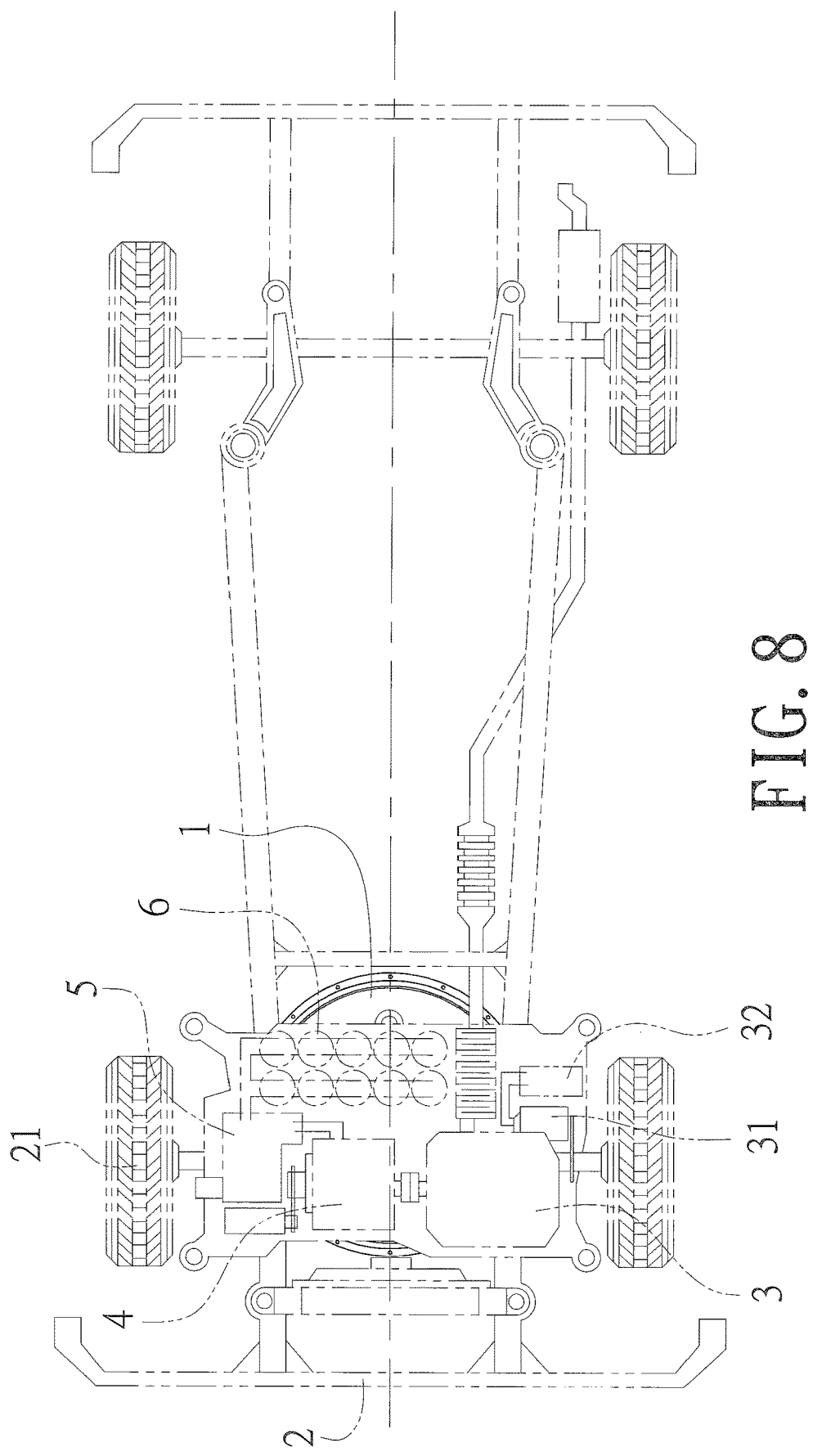
FIG. 8 is a bottom view of an embodiment in use according to the present invention.
Figure 9:
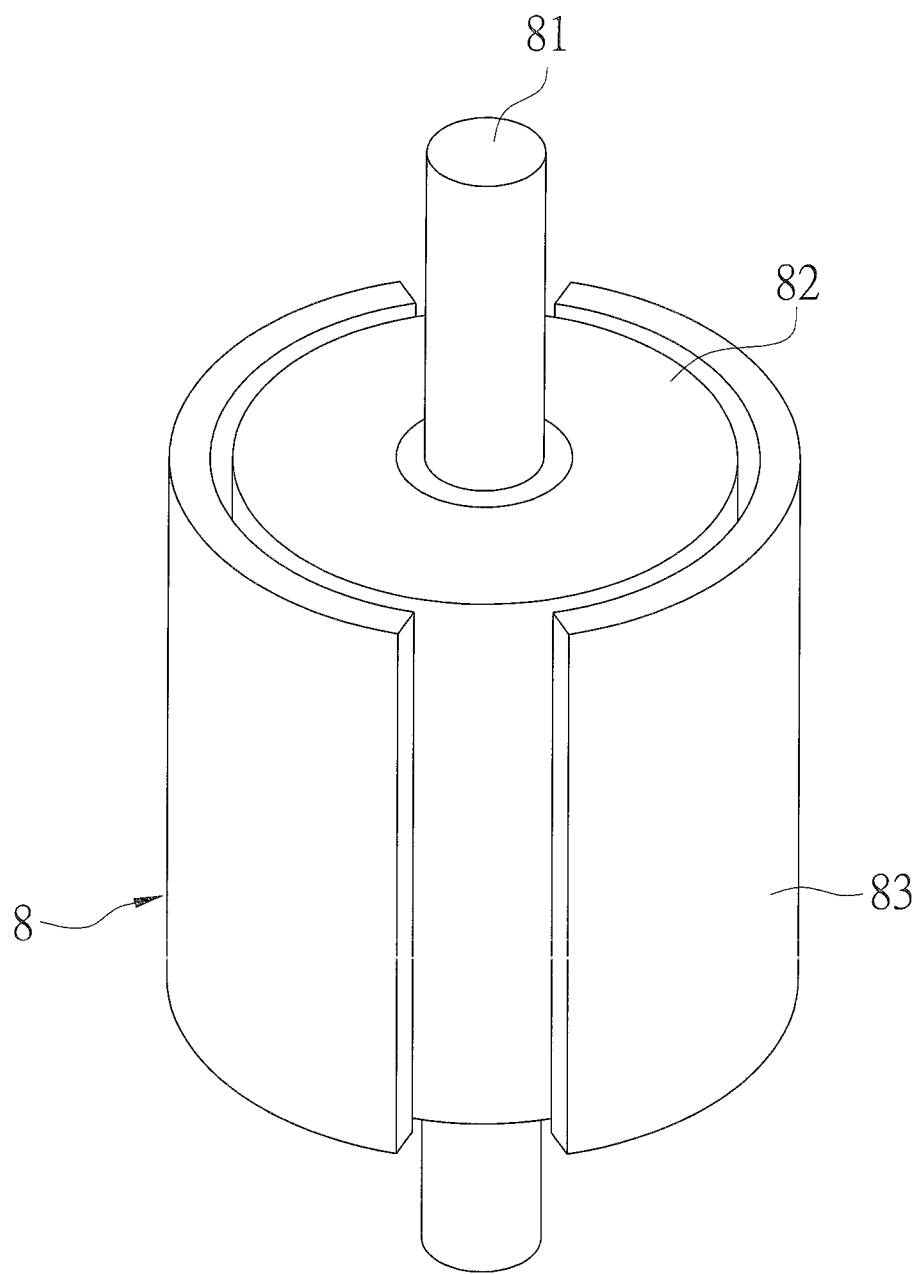
FIG. 9 is a perspective view of a cylindrical motor available now according to the present invention.

Refer to FIG. 7 and FIG. 8, the multi-ring disc motor 1 of the present invention can be either disposed on a front end of a body 2 of a motor vehicle (under a hood) or at a rear end thereof (under a trunk). A wheel 21 is arranged at each of two sides of both the front end and the rear end of the motor vehicle body 2. The motor vehicle body 2 is also set with a starter 31, a starter battery 32 connected to the starter 31, a small ultra-high-speed petrol engine 3 and a high-efficiency generator 4. The starter 31 is connected to the petrol engine 3 and the petrol engine 3 is connected to the generator 4. The petrol engine 3 is mainly used to drive the generator 4 for power generation and the generator 4 can provide high voltage direct current ranging from 380V to 480V and high current power. The motor vehicle body 2 is further arranged with an electric-energy-and-motor controller 5 and at least one capacitor battery 6 that has large capacity for electric power storage and rapid charge/discharge cycles. The generator 4 is connected to the electric-energy-and-motor controller 5 while the electric-energy-and-motor controller 5 is connected to the capacitor battery 6. The electric-energy-and-motor controller 5 regulates, rectifies and stabilizes the electric energy with high voltage and high current from the generator 4 and then the electric energy is suitable to be stored in the capacitor battery 6. The capacitor battery 6 is connected to the multi-ring disc motor 1 by a power cord while the electric-energy-and-motor controller 5 and the multi-ring disc motor 1 are connected by a signal cable. Thus the activation, the speed and certain actions such as stop of the multi-ring disc motor 1 is under control of the electric-energy-and-motor controller 5. Moreover, the shaft 19 of the multi-ring disc motor 1 is connected to a gearbox 7 in the motor vehicle body 2 by a transmission component 72. The transmission component 72 can be a gear mechanism. The gearbox 7 is connected to a differential 71 disposed on the front end or the rear end of the motor vehicle body 2 and the differential 71 is connected to the wheels 21 that are located on two sides of the motor vehicle and corresponding to the position of the differential 71 being arranged such as the front end or the rear end of the motor vehicle body 2.

Thereby the starter 31 of the motor vehicle drives the small ultra-high-speed petrol engine 3 to work and turn the high-efficiency generator 4 connected for generating high voltage and high current power while in use. Then the electric energy is delivered to the capacitor battery 6 for storage after being regulated, rectified and stabilized by the electric-energy-and-motor controller 5. The capacitor battery 6 sends the electric energy to the coils 14 on the stator rings 13 of the multi-ring disc motor 1 through the power cord. Thus a current is applied to the coils 14 on the stator rings 13 and a rotating magnetic field is generated between the permanent magnets 17 on the corresponding rotor base 16 for driving the rotor base 16 to rotate. At the moment, the shaft 19 assembled on the rotor base 16 is also rotated for driving the gearbox 7 connected to perform torque and horsepower conversions required. Next the differential 71 turns the wheels 21 connected on two sides to make the motor vehicle move.

In the present multi-ring disc motor 1, a plurality of stator rings 13 of different sizes is mounted in the stator base 11 while the rotor base 16 aligned and connected with the stator base 11 is also arranged with a plurality of circular ribs 165 of different sizes. A quite long radius of torsion is formed by the plurality of stator rings 13 and the plurality of circular ribs 165 added respectively. Moreover, the radius of torsion and the number of the permanent magnets of the present multi-ring disc motor 1 are multiple times than those of a cylindrical motor 8 available now owing to the plurality of coils 14 disposed on the stator rings 13 and the permanent magnets 17 arranged at the plurality of circular ribs 165 of the rotor base 16. According to the above design, the torque and the horsepower generated by the present multi-ring disc motor 1 are multiple times than those generated by the cylindrical motor 8 while being run at the same voltage and current. Thus the horsepower required during starting and driving of the vehicle and the torque required for climbing gradients are easily achieved. The power consumption is also lowered significantly. Therefore the battery life of the vehicle is extended and this eliminates the needs to stop for charging.

Besides the low production cost, the maintenance cost is relatively low due to simple structure of the present multi-ring disc motor 1. The multi-ring disc motor 1 is not damaged easily while in use. The present multi-ring disc motor 1 uses the Hall element 15 to detect changes in magnetic field during rotation of the rotor base 16 and make the coils 14 on the stator rings 13 have voltage regulation correspondingly. Thus the multi-ring disc motor 1 operates more smoothly and efficiently. Furthermore, the balancing pieces 168 around the circumference of the rotor base 16 are used to generate heat for heat dissipation in combination with the through holes 186, 119 on the cover 18 and the stator base 11. The design of the balancing pieces 168 and the reinforcement pieces 169 is also beneficial to the balancing of the rotor base 16 during rotation. Thus the interference and wear between the rotor base 16 and the stator base 11 during rotation of the rotor base 16 can be avoided. The rotor base 16 operates much more smoothly.

The present multi-ring disc motor 1 can also be used as a power system for ship or submarine propulsion owing to the features of high torque generated, high horsepower output and power saving resulted from the design of the radius of torsion and the plurality of permanent magnets. Such kind of power system suits long term sailing requirements on the sea. Moreover, the multi-ring disc motor 1 works quietly so that the submarine disposed with the multi-ring disc motor 1 can hardly be detected by sonar.

In summary, the present invention has the following advantages:

1. The multi-ring disc motor of the present invention not only outputs high torque and high horsepower by the plurality of stator rings on the stator base and the plurality of permanent magnets on the plurality of circular ribs of the rotor base but also saves electricity effectively. Thus the battery life of vehicles is extended and this eliminates the needs to stop for charging.
2. The present multi-ring disc motor mainly includes a plurality of stator rings mounted in a stator base and a plurality of permanent magnets disposed on a plurality of circular ribs of a rotor base. The power-saving as well as high torque and horsepower transmission is achieved by such simple structure/design of the motor. Moreover, both the production cost and the maintenance cost are effectively reduced. The multi-ring disc motor is not easily damaged while in use.
3. The Hall element disposed on the stator ring and connected to the coils is used for detecting changes in magnetic field during rotation of the rotor base and making the coils have corresponding voltage regulation. Thereby the multi-ring disc motor operates more smoothly and efficiently.
4. The balancing pieces around the rotor base are used to generate wind for heat dissipation. The design of the balancing pieces and the reinforcement pieces is beneficial to the balancing of the rotor base during rotation. Thus the interference and wear between the rotor base and the stator base during rotation of the rotor base can be avoided. The rotor base operates much more smoothly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A multi-ring disc motor comprising:
   a stator base including a cavity formed therein,
      a first axial hole arranged at a center of a bottom of the cavity,
      a plurality of first concentric circular ribs of different sizes disposed about the first axial hole, the first circular ribs having a common center,
      a plurality of first circular grooves defined by each of the first circular ribs respectively;
      a plurality of stator rings disposed on each of the first circular grooves respectively, and
      a plurality of coils disposed on the stator rings;
   a rotor base having a sleeve formed at a center of a base body thereof,
      a second axial hole penetrating a center of the sleeve,
      a first positioning part formed on a wall of the second axial hole,
      a plurality of second concentric circular ribs of different sizes disposed about the second axial hole, the second circular ribs having a common center,
      a plurality of second circular grooves defined by each of the second circular ribs respectively; and
      a plurality of permanent magnets respectively disposed on an outer wall of each of the second circular ribs;
   a cover covering an opening of the cavity of the stator base, the cover being fastened with the stator base, and a third axial hole formed at a center of the cover; and
   a shaft passing through the third axial hole of the cover, the second axial hole of the rotor base, and the first axial hole of the stator base, the shaft having a second positioning part connected to and positioned by the first positioning part on the wall of the second axial hole of the rotor base;
   wherein the rotor base and the stator base are aligned and connected with each other, the first circular ribs of the stator base and the stator rings being mounted in the second circular grooves of the rotor base respectively, and the second circular ribs of the rotor base and the permanent magnets mounted thereon being received in the first circular grooves of the stator base respectively; the permanent magnets on each of the second circular ribs of the rotor base thereby correspond in position to the coils on the stator rings in each of the first circular grooves of the stator base.

2. The multi-ring disc motor as claimed in claim 1, further comprising at least one Hall element disposed on at least one of the stator rings and connected to the corresponding coil on the respective stator ring.

3. The multi-ring disc motor as claimed in claim 2, wherein a plurality of coil mounting holes are radially formed about an end surface of each of the stator rings, and each of the coils is wound between corresponding two adjacent coil mounting holes.

4. The multi-ring disc motor as claimed in claim 3, wherein a mounting slot formed on an inner wall of each of the stator rings corresponds in position to and communicates with the respective coil mounting hole; the Hall element is mounted and positioned in the mounting slot to communicate with the corresponding coil mounting hole.

5. The multi-ring disc motor as claimed in claim 1, wherein a plurality of coil mounting holes are radially formed about an end surface of the stator rings, and each of the coils is wound between corresponding two adjacent coil mounting holes.

6. The multi-ring disc motor as claimed in claim 1, wherein a plurality of mounting parts are concavely disposed on the outer wall of each of the second circular ribs for receiving the permanent magnets respectively.

7. The multi-ring disc motor as claimed in claim 1, wherein a plurality of locking slots are formed on an outer wall of the stator rings, and a plurality of locking members corresponding in position to the locking slots are formed on the first circular ribs and on a wall of the cavity for being locked with and positioned by the locking slots of the stator rings respectively.

8. The multi-ring disc motor as claimed in claim 1, wherein a plurality of balancing pieces are disposed on a circumference of the base body of the rotor base, and a reinforcement piece is formed on a bottom side of each of the balancing pieces to thereby be located on the circumference of the base body of the rotor base; the reinforcement pieces being integrally formed with the balancing pieces.

9. The multi-ring disc motor as claimed in claim 1, wherein a recess is formed at the center of the bottom of the cavity, and the first axial hole is formed at a bottom of the recess; a bearing is mounted in the recess and is stopped at an opening of the recess by a stopper to thereby be positioned in the recess; the shaft being passed through the first axial hole of the stator base and the bearing mounted in the stator base.

10. The multi-ring disc motor as claimed in claim 1, wherein a recess is formed at a center of an inner surface of the cover, and the third axial hole is set at a bottom of the recess; a bearing is mounted in the recess and is stopped at an opening of the recess by a stopper to thereby be positioned in the recess; the shaft being passed through the third axial hole of the cover and the bearing mounted in the cover.

* * * * *